US006541769B1

(12) United States Patent
Takada et al.

(10) Patent No.: US 6,541,769 B1
(45) Date of Patent: Apr. 1, 2003

(54) MASS SPECTROMETER

(75) Inventors: Yasuaki Takada, Kiyose (JP); Yasushi Terui, Tsuchiura (JP); Kiyomi Yoshinari, Hitachi (JP); Takayuki Nabeshima, Kokubunji (JP); Minoru Sakairi, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 218 days.

(21) Appl. No.: 09/660,359

(22) Filed: Sep. 12, 2000

(30) Foreign Application Priority Data

Sep. 14, 1999 (JP) ........................................ 11-260841

(51) Int. Cl.[7] ...................... B01D 59/44; H01D 49/00; H01J 49/28

(52) U.S. Cl. ...................... 250/290; 250/299; 250/293; 250/294; 250/296; 250/300

(58) Field of Search ................................ 250/292, 290, 250/293, 294, 296, 299, 300, 281, 283, 285, 288, 289

(56) References Cited

U.S. PATENT DOCUMENTS 3,803,410 A * 4/1974 Banner ...................... 250/299
4,810,882 A * 3/1989 Bateman .................... 250/281
5,089,703 A * 2/1992 Schoen et al. ............. 252/292
5,381,007 A * 1/1995 Kelley ....................... 250/282
5,663,560 A * 9/1997 Sakairi et al. ............. 250/281
5,672,868 A * 9/1997 Mordehai et al. .......... 250/281
6,060,706 A * 5/2000 Nabeshima et al. ........ 250/288
6,075,243 A * 6/2000 Nabeshima et al. ........ 250/292
6,157,030 A * 12/2000 Sakairi et al. ............. 250/292
2002/0008198 A1 * 1/2002 Kasten et al. ............... 250/292

FOREIGN PATENT DOCUMENTS

DE 198 06 018 A1 * 2/1998 .......... G01N/27/62
JP 1-309300 12/1989
JP 09-161719 * 6/1997 ............ H01J/49/22
JP 09-190797 * 7/1997 ............ H01J/49/22

OTHER PUBLICATIONS

"BUNSEKI", Journal of the Japan Society for Analytical Chemistry, vol. 5, 1996, p. 342.

* cited by examiner

*Primary Examiner*—John R. Lee
*Assistant Examiner*—Bernard E. Souw
(74) *Attorney, Agent, or Firm*—Mattingly, Stanger & Malur, P.C.

(57) ABSTRACT

An ion-deflecting device is located between a mass spectrometer and a detector, and undesired signal sources are prevented from reaching the detector during the ion-trapping period by switching the voltage applied to the detector between the ion-trapping period and the mass-analyzing period. A first voltage is applied to the detector during an ion-trapping period while a second voltage is applied to the detector during a mass-analyzing period. An ion-deflecting device deflects ions such that they do not reach the detector during an ion-trapping period while they do reach the detector during a mass-analyzing period. This way, the life of the detector is increased.

17 Claims, 7 Drawing Sheets ion trapping period
(energy-300eV)

ion trapping period
(energy-1keV)

analyzing period
(energy-1eV)

analyzing period
(energy-10eV)

analyzing period
(energy-100eV)

analyzing period
(energy-300eV)

MASS SPECTROMETER

BACKGROUND OF THE INVENTION

The present invention relates to the field of analytic chemistry, and especially to a mass spectrometer including a quadruple ion-trap type mass spectrometer unit.

A plasma ionizing mass spectrometer method, in which a sample is analyzed by being put in plasma generated at atmospheric pressure, and having the ionized sample introduced into the plasma in a vacuum, is well known as a high-sensitivity elemental analysis method. The general apparatus most generally used for this method is an inductively coupled plasma-mass spectrometer (hereafter abbreviated to ICP-MS). Plasma is generated by using a high frequency radio-wave, and a sample is ionized by being put in the generated plasma. Then, the ionized sample is introduced into a vacuum through a pinhole, and is analyzed. The ICP-MS is disclosed, for example, in "BUNSEKI", Journal of The Japan Society for Analytical Chemistry, p 342, vol. 5, 1996.

In the ICP-MS, since argon gas is used to generate plasma, a large quantity of matrix ions, such as $Ar^+$ ions, $ArO^+$ ions, etc., which are produced from argon gas used, is generated. Therefore, there has been a problem in that ions such as $Ca^+$ ions, $Fe^+$ ions, etc., whose mass is near that of the matrix ion, can just barely be detected. Thus, a microwave induced plasma-mass spectrometer (hereafter abbreviated to MIP-MS), in which a microwave is used to generate plasma, has been developed. In the MIP-PS, since the high energy density can be obtained by concentrating energy into a narrow space, nitrogen or helium gas can be used as plasma source gas, which in turn can prevent the generation of argon gas related matrix ions. Consequently, it has become possible to analyze elements such as calcium, iron, and so on, with a high sensitivity. The conventional technique of the MIP-PS is disclosed, for example, in Japanese Patent Application Laid-Open Hei 1-309300. Meanwhile, it is known that since the plasma temperature in the MIP-MS is lower than that in the ICP-MS, the analysis sensitivity of the ICP-MS is higher for analyzing elements with high ionization potential than that of the MIP-MS.

The plasma-mass spectrometer such as the ICP-MS, the MIP-MS, etc., is generally used in the field of the analysis for environmental evaluation.

Meanwhile, these spectrometers are equipped with a protection cover to prevent an electrical shock, a heat burn, an influence of a high-frequency radio-wave on a human body, etc.

Here, because particles such as neutral particles, which pass through the mass spectrometer, may reach a detector, and may become detection noises, the mass spectrometer is sometimes composed so that the detector is located in a direction, altered from that in which ions are ejected from the ion ejection hole of the mass spectrometer. For the purpose, a deflecting device is located between the mass spectrometer and the detector. Such a deflecting device is disclosed in Japanese Patent Application Laid-Open Hei 9-161719 and Japanese Patent Application Laid-Open Hei 9-190797. Since the generated neutral particles which become noise sources go straight, they cannot reach the detector. On the other hand, the selected and ejected ions are led by the deflecting device to the detector, and are so detected.

In the plasma ion source-mass spectrometer such as the ICP-MS, the MIP-MS, etc., although various types of mass spectrometers can be used, the use of a quadrupole ion-trap type (referred to simply as ion-trap type) mass spectrometer has recently been tried. It is known that argon gas related molecular ions ($ArO^+$, $Arcl^+$, etc.), or metal oxide ions ($CaO^+$, etc.), which hinder the analysis, can be decomposed by collisions among them in the quadrupole ion-trap type mass spectrometer.

As mentioned above, it has become possible to provide the plasma ion source-mass spectrometer with a new function which can decompose molecular ions hindering the analysis, constructed by combining the plasma ion sources such as the ICP, the MIP, etc., and an ion-trap type mass spectrometer. However, in the ion-trap type mass spectrometer, since the plasma-confinement potential is distorted by the space-charge effect if a large quantity of ions is confined in the mass spectrometer, this may deteriorate the fundamental analysis performances such as the mass resolution. Also, in the plasma ion source-mass spectrometer, since there is a large quantity of plasma gas related ions, and they are confined in the mass spectrometer, the induced space-charge effect becomes great.

SUMMARY OF THE INVENTION

An objective of the present invention is to provide a mass spectrometer which can prevent the degradation of its fundamental analysis performances, such as mass resolution, by reducing the above space-charge effect, so as to suppress the distortion of the confinement potential due to this space-charge effect.

Further, another objective of the present invention is to realize a lasting stable analysis in a plasma ion source-mass spectrometer which uses an ion-trap type mass spectrometry unit, by protecting an ion detector from being over-exposed by particles.

The using of a comparatively large size mass spectrometry unit has been investigated for a plasma ion source-mass spectrometer which uses an ion-trap type mass spectrometry unit. The size increase of a mass spectrometer increases the volume of the mass spectrometer, which in turn will reduce the space-charge effect of plasma ions. On the other hand, if the size of the mass spectrometer is increased, this causes a disadvantage in that the measurable upper limit of mass number decreases. However, since the required upper limit of mass number is approximately 250 in the element analysis field in which the plasma ion source-mass spectrometer is mainly used, the size of a mass spectrometer can be increased within a range satisfying the above condition.

Thus, a plasma ion source-mass spectrometer which uses an ion-trap type mass spectrometry unit with a size larger than that of conventional type of plasma ion source-mass spectrometry units has been developed and evaluated. That is, the smallest inside diameter $r\mathbf{0}$ in the ring electrode of the developed mass spectrometry unit is 16 mm which is larger than 7 mm or 10 mm of the conventional type of plasma ion source-mass spectrometry units. From the evaluation results, it has been found that the developed mass spectrometry unit has a new subject.

In the ion-trap type mass spectrometry unit, a mass spectrum is obtained by alternately setting an ion-confining (or trapping ) period and a mass-analyzing period. An electrode called an ion-stopping electrode is usually located between a mass spectrometry unit and a detector. During the ion-stopping period, positive voltage (typically +300V) is applied to the ion-stopping electrode so that ions do not reach the detector. On the other hand, during the mass-analyzing period, negative voltage (typically −300V) is applied to the ion-stopping electrode so that ions can pass through this electrode and reach the detector. In this way, by switching the sign of the voltage applied to the ion-stopping electrode, the timing of when ions reach the detector is controlled.

However, it was found that the detector actually outputs a high-level signal even during the ion-stopping period. Thus, it was proved that there is a problem in which the detector may break down due to the influence of an over current, or, the lifetime of the detector may be remarkably decreased.

It should be noted that, the efficiency of confining plasma gas related ions is low under the conditions suitable for confining ions of a sample. Therefore, one cause of the above problem is that many of the plasma gas related ions, which have reached the mass spectrometry unit, possibly pass through it and reach the detector. Accordingly, since a large quantity of plasma gas related ions pass through the mass spectrometry unit and reach the detector despite the preventing of ion-ejection from the mass spectrometry unit by applying positive voltage to the ion-stopping electrode, a load on the detector may become excessive in the state in which a high-level amplification-voltage is applied to the detector so as to detect ions of an infinitesimal sample.

Although the energy of ions which enter the mass spectrometry unit is adjusted to be several eV, the energy of the ions in the mass spectrometry unit may be increased sometimes to more than 300 eV due to the acceleration which the ions receive in the mass spectrometry unit. Also, a high-frequency radio-wave with an amplitude of ±7 kV is generally applied to a ring electrode of the mass spectrometry unit. Further, since the potential of an endcap electrode in the mass spectrometry unit is maintained to be 0V, the potential near the center of the space surrounded by the endcap electrodes 72, the ring electrode 71, and the ion-stopping electrode 73, in the mass spectrometry unit does not increase to a high voltage such as that applied to the ring electrode. However, it is considered that if a comparatively large size mass spectrometry unit is used, the distance between the ring electrode and the endcap electrode is increased, which in turn makes the variation of the potential near the center of the mass spectrometry unit large, and the acceleration of the ions in the mass spectrometry unit becomes great.

By increasing the voltage applied to the ion-stopping electrode, it may be possible to prevent the ions, which are accelerated to more than 300 eV in the mass spectrometry unit during the ion-confining period, being ejected, and reaching the detector. However, it was proved that this method cannot completely resolve the above problem. Although the signal level of the detector decreased to about one tenth when the voltage of +800V was applied to the ion-stopping electrode during the ion-confining period, a continuous signal of a level about 100 times higher than that of a signal observed during the mass-analyzing period, was observed in the above situation. Further, even if voltage higher than +800V was applied to the ion-stopping element, the level of the detected signal was not remarkably changed. From the above observation, some neutral particles may relate to the high-level signal of the detector during the ion-confining period. For example, it is possible that ions accelerated in the mass spectrometry unit cause charge-exchange reactions with neutral gas molecules, reach the detector as neutral particles with high energy, and are detected.

The present invention resolves the above problem by preventing the undesired ions which have passed the aperture of the ion-stopping electrode from reaching the detector during the ion-confining period.

Thus, to achieve the above objectives, the present invention provides a mass spectrometer comprising: an ion source-generating unit to ionize a sample; an ion-trap type mass spectrometry unit for analyzing mass of respective ions introduced from the ion source-generating unit; a detector to detect ions ejected from the ion-trap type mass spectrometry unit; and a switching device for switching the voltage applied to the detector from a first voltage value to a second voltage value just before analyzing mass of ions is started in the ion-trap type mass spectrometry unit.

In the above mass spectrometer, wherein the detector is located at a position in a direction different from that in which ions are ejected from an outlet of the ion-trap type mass spectrometry unit.

Further, the present invention provides a mass spectrometer comprising: an ion source-generating unit to ionize a sample: an ion-trap type mass spectrometry unit for analyzing the mass of respective ions introduced from the ion source-generating unit; a detector to detect ions ejected from the ion-trap type mass spectrometry unit; and an ion-deflecting device situated between the detector and the ion-trap type mass spectrometry unit.

In the above mass spectrometer, the ion-deflecting device is composed of a plurality of electrodes, and at least one of the electrodes is grounded.

Also, in the above mass spectrometer, the ion-deflecting device is composed of a first electrode and a second electrode, and the first electrode is connected to power sources for applying the positive and negative voltage, respectively.

Furthermore, a mass spectrometer comprising: an ion source-generating unit to ionize a sample; a first ion-deflecting device for deflecting ions generated in the ion source-generating unit; a ring electrode with a more than 16 mm diameter at the position where high-frequency voltage is applied to the deflected and introduced ions in order to analyze mass of the respective ions; first and second dish electrodes, in each of which an aperture is shaped, arranged at both sides of the ring electrode, respectively; a detector to detect ions ejected from the aperture of the second dish electrode; and a second ion-deflecting device, which is located between the second dish electrode and the detector, for deflecting the ions ejected from the aperture of the second dish electrode.

DETAILED DESCRIPTION OF THE EMBODIMENTS

Hereafter, details of the embodiments according to the present invention will be explained with reference to the drawings.

Figure 1:
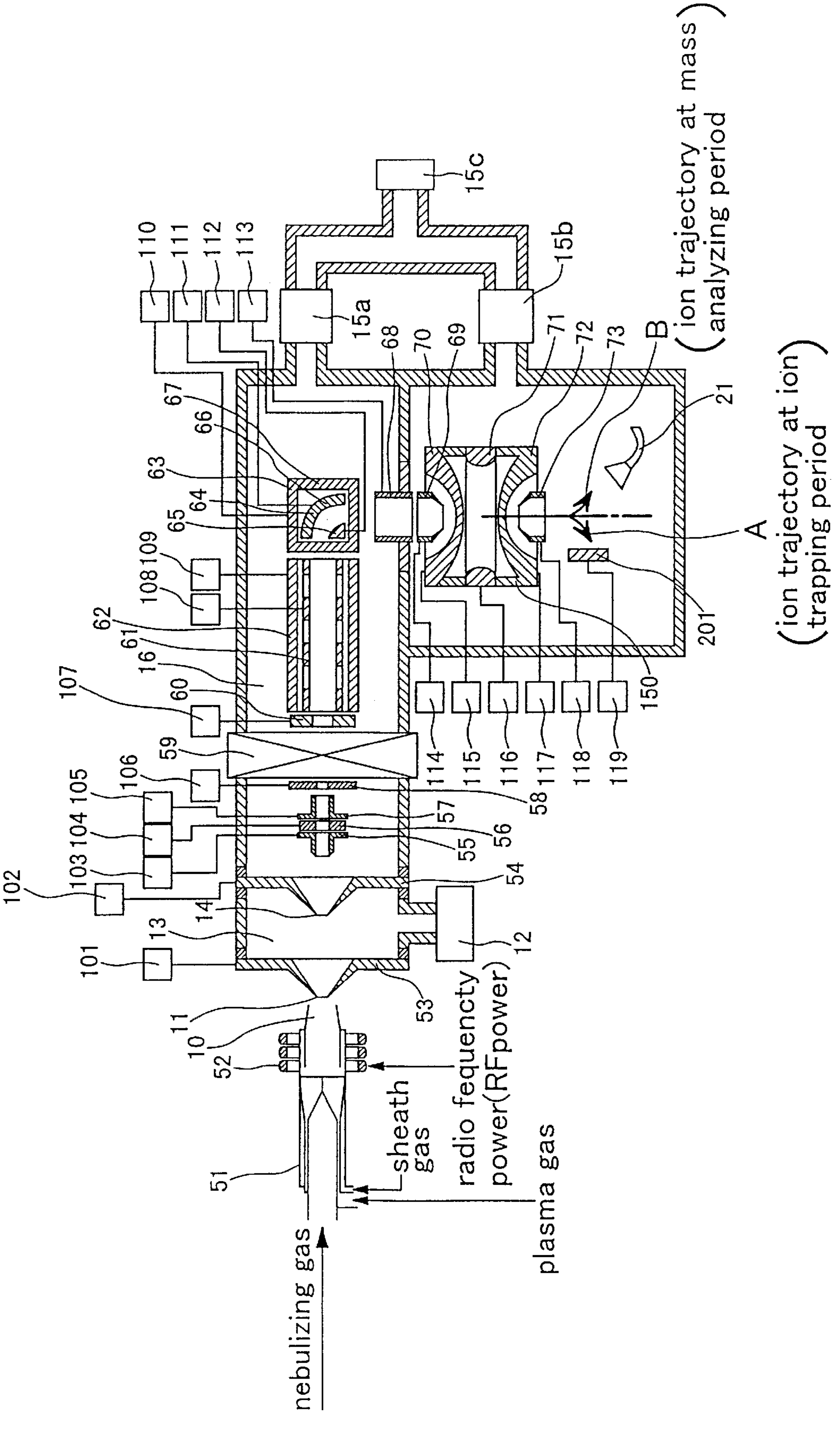
FIG. 1 is a vertical cross section of a mass spectrometer of a first embodiment according to the present invention.

In the following, the first embodiment will be explained. FIG. 1 shows a vertical cross section of a mass spectrometer of a first embodiment according to the present invention.

An example of the ICP-MS including an ion-trap type mass spectrometry unit is explained in detail below with reference to FIG. 1.

A torch 51 used for generating ICP is generally triple-tube-structured. Nebulizing gas, which is generated as fine liquid particles of a sample solution by a sprayer, is fed into the central portion of this torch 51. Further, gas (mainly composed of argon), used to generate plasma, is streamed outside the nebulizing gas. Furthermore, sealing gas to generate a gas current of a predetermined pattern, and to maintain the generated plasma, is introduced into the torch 51, being streamed outside the gas which is streamed outside the nebulizing gas. An induction coil 52 is located outside the top peripheral portion of the torch 51, and radio frequency power (RF power) is fed to the induction coil 52. An electric field is induced at the top peripheral portion of the torch 51 by the alternating magnetic field generated by the induction coil 52. Further, this generated electric field ionizes the gas used to generate plasma, and plasma 10 is generated. The fine liquid drops of the sample solution, which have been introduced in the plasma, are exposed in the high-temperature plasma. Then, the fine liquid drops are instantaneously vaporized, and substances contained in the liquid drops are atomized. Further, the atomized substances are ionized. The ions of the sample substances, which are generated by the above processes, are taken into a vacuum region 16 via the first aperture 11, a differential pumping region evacuated by a vacuum pumping system 12, and the second aperture 14. A vacuum pumping system for evacuating the vacuum region 16 is composed of turbo molecular pumps 15*a* and 15*b*, and a robust pump 15*c*. It is desirable to use an ion-free scroll pump for the vacuum pumping system 12 used to evacuate the differential pumping region 13 in order to keep the inside of the differential pumping region clean. Also, it is favorable to compose the vacuum pumping system as to evacuate the vacuum region 16, with the magnetic levitation type turbo molecular pumps is a and 15*b*, and the oil-free scroll pump 15*c*, in order to keep the vacuum region 16 clean. An electrode 53 in which the first aperture 11 is formed, and an electrode 54 in which the second aperture 14 is formed, are connected to the power sources 101 and 103 for applying the voltage to these electrodes. Meanwhile, it is possible to set both electrodes 53 and 54 to the same potential. By adjusting the voltage applied to the electrode 54 in which the second aperture 14 is formed, the energy of ions injected into the ion-trap type mass spectrometry unit is adjusted so that the ion-confinement efficiency arrives at a desired value. The ions introduced into the vacuum region are converged by Einzel lenses 55, 56, and 57, and pass through a slit electrode 58 having a small aperture. These lenses 55, 56, and 57, are connected to the respective power sources 103, 104, and 105. Also, the slit electrode 58 is connected to a power source 106. The major part of liquid drops which have not been vaporized are removed by the slit electrode 58. In the ordinary cleaning of the system, it is sufficient to decompose and clean up the components for generating plasma after closing a gate valve 59. Since contaminants mainly adhere to the periphery region around the first aperture and the slit electrode 58, the cleaning can be very easily carried out by cleaning up these portions. By providing the gate valve 59, it becomes possible to clean up the system while keeping the vacuum region, in which the mass spectrometry unit is located, in the evacuated state, and this reduces the time until the analysis is restarted. The gate valve 59 is usually grounded. Meanwhile, although the diameter of the ion beams is broadened while the ion beam is passing through the gate valve 59, the ion beam is injected into a double-tube-structured electrostatic ion guide composed of an inner cylindrical electrode 61 in which an aperture is formed, and an outer cylindrical electrode 62, situated outside the electrode 61, and is again converged. Since the voltage is applied to the electrodes 61 and 62, which compose the electrostatic ion guide, a shield electrode 60 is located between the gate valve 59 and the electrostatic ion guide in order to prevent the ion beam from being affected by the electric field of the electrostatic ion guide while passing through the gate valve 59. After the ion beam has passed through the gate valve 59, the trajectory of the ion beam is bent by a deflector composed of a deflector case 63, an outer electrode of deflector 64, and an inner electrode of deflector 65. This deflector is situated in order to separate the trajectory of the ion beam from that of photons emitted from the plasma, because if the photons reach the detector, the photons cause noises which affect the lower detectable limit of the signal level. Further, to prevent photons from reaching the detector through diffuse reflection, apertures 66 and 67 are formed in the outer electrode of deflector 64 and the deflector case 63, respectively, so that the photons going straight pass through the deflector. The ion beam which passed through the deflector is converged by a lens electrode 68, and are further input in the quadrupole ion-trap type mass spectrometry unit via a gate electrode 69. The quadrupole ion-trap type mass spectrometry unit is composed of a pair of endcap electrodes 70 and 72, and a ring electrode 71. The gate electrode 69 is situated to control the timing of injecting the ion beam into the quadrupole ion-trap type mass spectrometry unit. First, the high-frequency voltage is applied to the ring electrode 71 so as to generate the ion-confining potential in the quadrupole ion-trap type mass spectrometry unit. During the ion-confining period, the voltage of −70V is applied to the gate electrode 69 so that the ion beam can pass through the aperture of the gate electrode 69. Here, helium gas is fed into the quadrupole ion-trap type mass spectrometry unit from a helium gas-feeding vessel (not shown in this figure), and the pressure in the mass spectrometry unit is maintained at about 1 mtorr. The ions which have been injected into the quadrupole ion-trap type mass spectrometry unit lose their energy while colliding with helium molecules, and are trapped by the ion-trapping potential. After the injected ions are stored for a predetermined period (typically for about 50 ms) in the mass spectrometry unit, the process goes to the step of analyzing the ion mass. During the mass-analyzing period, the voltage of +70V is applied to the gate electrode 69 so that the ion beam cannot pass through the aperture of the gate electrode 69. Next, by gradually increasing the amplitude of the high-frequency voltage applied to the ring electrode 71, the motion trajectories of the confined ions become unstable and are expelled from the mass spectrometry unit in the increasing order of values obtained by dividing the mass numbers of respective ions by their respective charge values. The expelled ions are detected by the detector 21. After the analyzing of the ion mass is completed, the ions remaining in the mass spectrometry unit are removed by turning off the voltage applied to the ring electrode 71 so as to extinguish the ion-trapping potential. By repeating the above processes of confining ions and analyzing the ion mass, the mass spectrum of the sample is obtained.

In the step of analyzing the ion mass, it is also possible to assist in the expelling of ions from the mass spectrometry unit by applying a high-frequency signal of a predetermined frequency between the endcap electrodes 70 and 72 in order to improve the mass resolution. Moreover, by applying the positive voltage (typically +300V) to the ion-stopping electrode 73 in the time outside the mass-analyzing period, stray ions are prevented from reaching the detector 21. During the mass-analyzing period, negative voltage (typically −300V) is applied to the ion-stopping electrode 73 situated between the detector 21 and the endcap electrode 72 nearer the detector 21 so that the ions whose mass has been selected can reach the detector 21.

Meanwhile, the deflector case 63, the outer electrode of deflector 64, the inner electrode of deflector 65, the lens electrode 68, the gate electrode 69, the endcap electrode 70, the ring electrode 71, the endcap electrode 72, and the ion-stopping electrode 73, are connected to the power sources 110, 111, 112, 113, 114, 115, 116, 117, and 118, respectively.

The detector 21 is located at the position in the direction shifted from that in which the ions are ejected from the outlet of the endcap electrode 72. Naturally, it is possible to locate the detector 21 at the position in the direction in which the ions are ejected. Further, an ion-deflection device, for example, an ion-deflecting electrode 201 shown in FIG. 1, is located between the ion-stopping electrode 73 and the detector 21. Here, a deflector such as that shown by the ion-deflecting electrode 201, in which the deflection voltage is applied "by power source 119" to a single electrode, or a deflector composed of two combined electrodes, can be used as the ion-deflecting device. Thus, by switching the voltage applied to the ion-deflecting electrode 201, corresponding to the operation of the ion-trap type mass spectrometry unit, the direction of the ejected ion beam is controlled to the direction A or B. In the process of confining ions in the mass spectrometry unit, the voltage of the ion-deflecting electrode 201 is set to a level such that the ions ejected from the ion-trap type mass spectrometry unit do not reach the detector 21. On the other hand, in the process of analyzing the ion mass, the voltage of the ion-deflecting electrode 201 is set to a level such that the ions ejected from the ion-trap type mass spectrometry unit reach the detector 21. In this way, by switching the voltage applied to the ion-deflecting electrode 201, it becomes possible to resolve the problem of undesired ions reaching the detector 21, and this deteriorates the performance of the detector 21.

The above Japanese Patent Application Laid-Open Hei 9-161719 discloses the above-described composition in that a detector is located at a position in the direction shifted from that in which ions are ejected from the outlet of an endcap electrode, and an ion-deflecting device for leading the ejected ions to the detector is situated. However, this conventional technique is aimed at improving the ratio of signal to noises (S/N ratio) by deflecting ions ejected from the mass spectrometry unit so as to separate the ions from neutral particles which are noise sources. The conventional techniques do not disclose or indicate the technique according to the present invention, in which the desired ions are separated from particles which are not desired, by switching the voltage applied to the ion-deflecting device, corresponding to the operation of the mass spectrometry unit. Although Japanese Patent Application Laid-Open Hei. 9-190797 discloses a technique in that the voltage applied to an ion-deflecting device is changed during the mass-analyzing period, it does not disclose or indicate the technique according to the present invention, in which the desired ions are separated from particles which are not desired, by switching the voltage applied to the ion-deflecting device, corresponding to the operation of the mass spectrometry unit.

Figure 2:
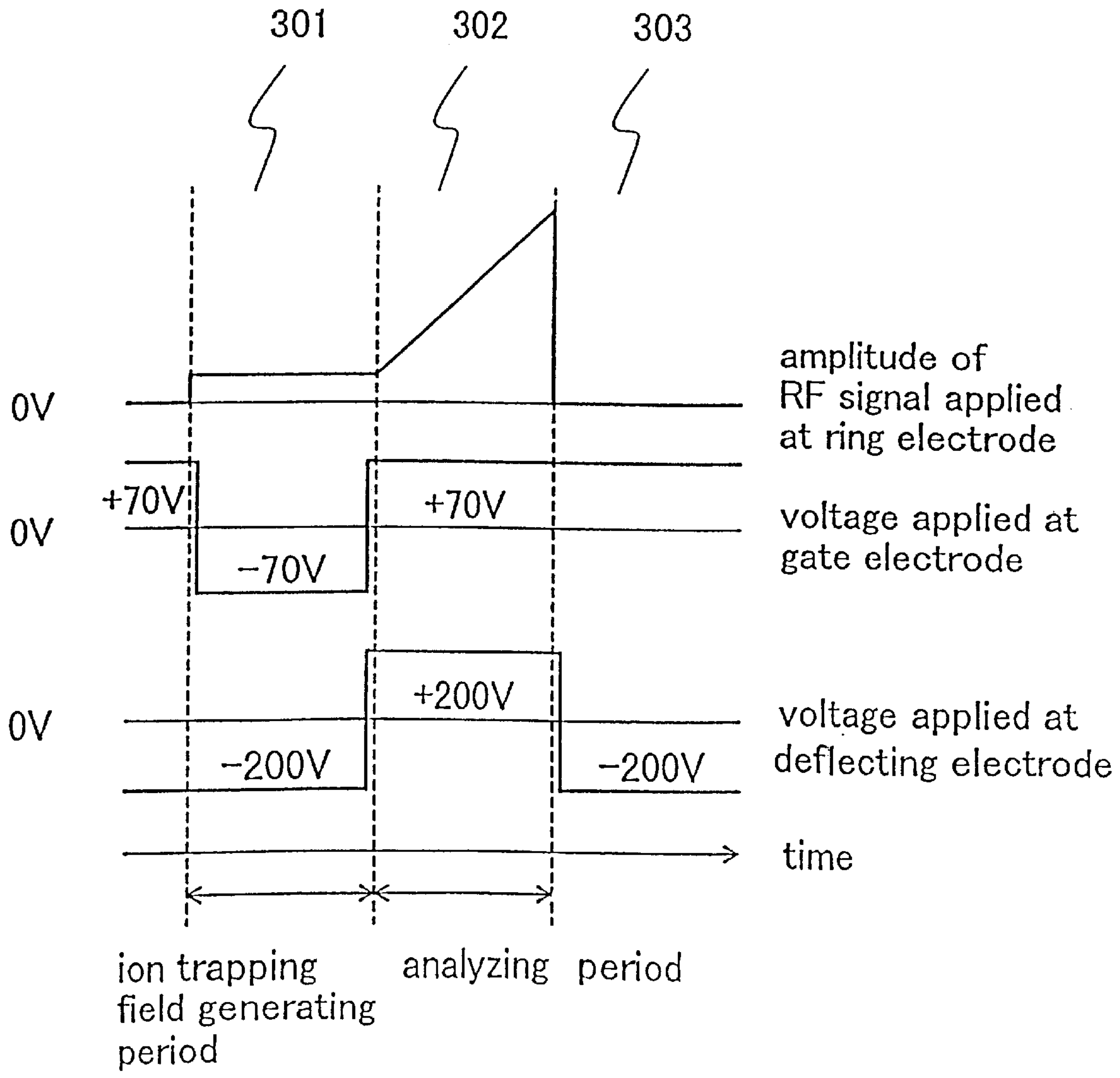
FIG. 2 is a time chart showing the voltage change operation performed in the mass spectrometer of the first embodiment.

FIG. 2 shows a time chart of changing the voltage applied to the ion-deflecting electrode 201. Before the operation mode-switching from the ion-confining field-generation period 301 to the mass-analyzing period 302, "and during the recycling period 303 thereafter," the voltage applied to the gate electrode is switched so as to prevent ions from reaching the detector. Next, the voltage applied to the ion-deflecting electrode is switched so as to change the direction of ions ejected from the mass-spectrometry unit. Therefore, it is possible to prevent ions with high energy, which pass through the ion-stopping electrode during the ion-confining period. For example, in the ICP-MS shown in FIG. 1, ions to be analyzed are positive ions. Accordingly, if the voltage of −200V is applied to the ion-deflecting electrode during the ion-confining period, the trajectory of the ejected ions is bent toward the ion-deflecting electrode. On the other hand, if the voltage of +200V is applied to the ion-deflecting electrode during the mass-analyzing period, the ejected ions can be led toward the detector.

Needless to add, it is possible to locate the detector 21 at the same side of the ion-deflecting electrode 201 in FIG. 1, and apply the voltage reverse to that shown in FIG. 2 to the ion-deflecting electrode 201.

In the following, the second embodiment will be explained.

Since the fundamental composition of the mass spectrometer is the same as that shown in FIG. 1, in this embodiment as well as the following embodiments, the explanation of the composition of the mass spectrometer is omitted.

Figure 3:
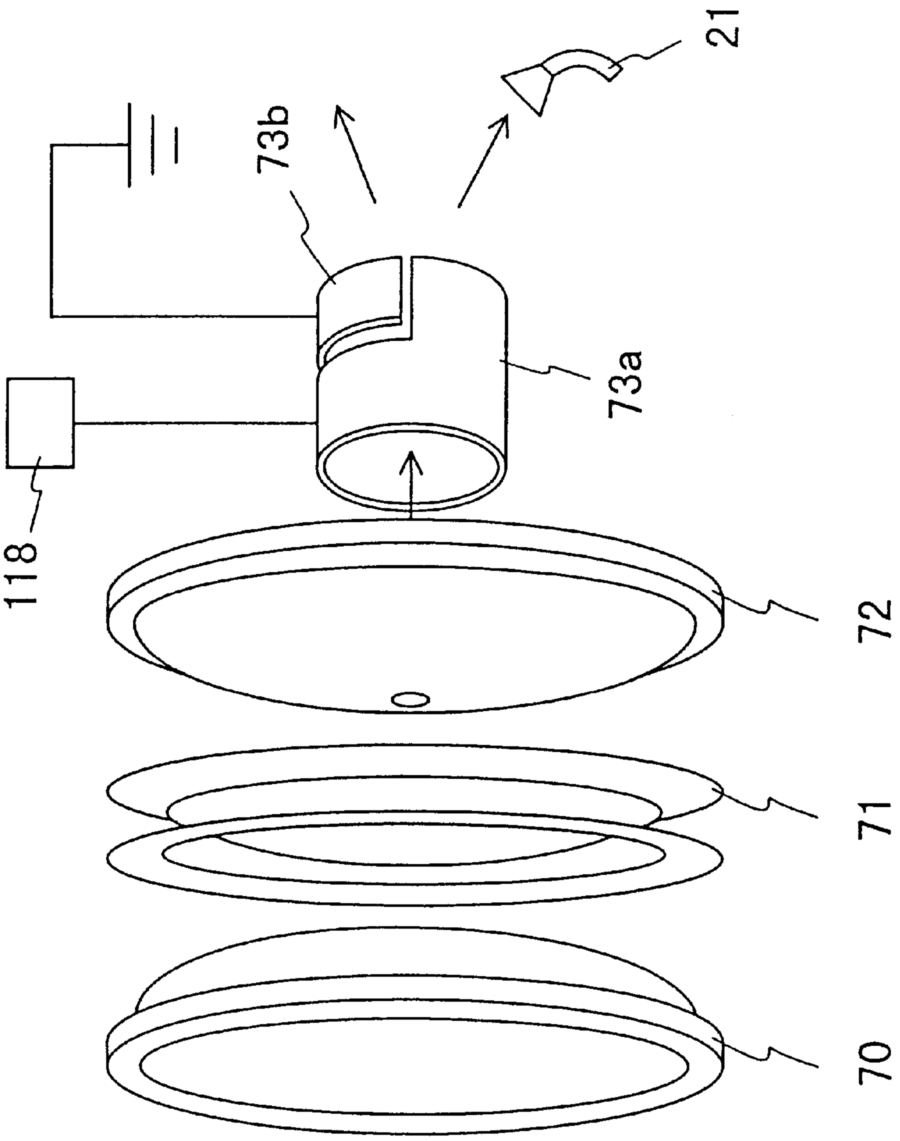
FIG. 3 is a diagram showing a main portion of a mass spectrometer of a second embodiment according to the present invention.

FIG. 3 shows a main portion of a mass spectrometry unit of a second embodiment according to the present invention.

Here, it is possible to compose the ion-stopping electrode 73 so that an ion-deflecting electrode for generating the electric field to deflect the ion beam ejected from the mass spectrometry unit, is shaped in the electrode 73. For example, as shown in FIG. 3, the ion-stopping electrode 73 is divided into two different electrodes **73*a* and 73*b*, and one of the two electrodes 73*a* and 73*b* is used as an ion-deflecting electrode, to which the voltage of a predetermined level is applied. Since, the voltage applied to the ion-stopping electrode (the electrode 73*a* in the example shown in FIG. 3) is switched between the ion-confining and mass-analyzing periods, the electric field generated by the two electrodes 73*a* and 73*b* functions as a deflector for switching the direction of the ion beam ejected from the mass spectrometry unit. In this embodiment, the electrode 73*b* is grounded as shown in FIG. 3**, and this makes it unnecessary to provide a power source exclusive for this electrode.

Figure 4:
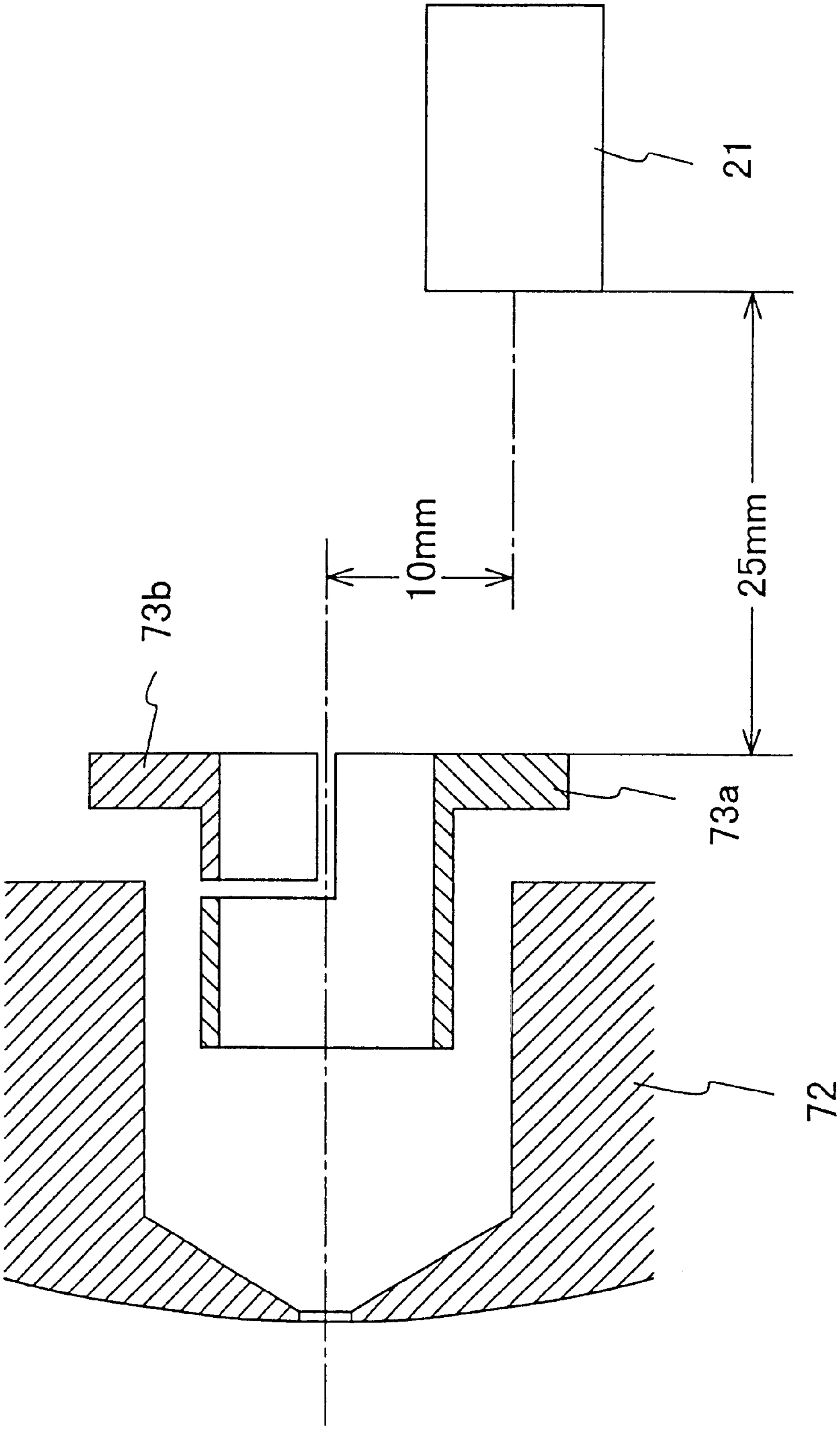
FIG. 4 is a diagram showing the structure of the main portion shown in FIG. 3 in more detail.
Figure 5A:
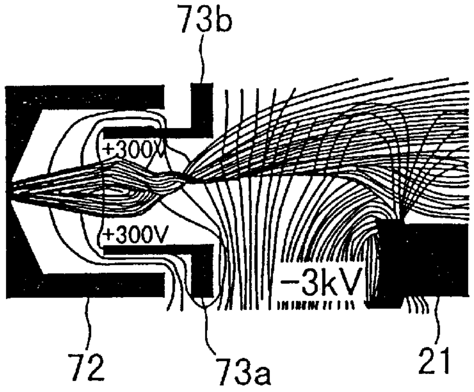
FIG. 5 is an illustration showing each example of the trajectories of ions in the mass spectrometer of the second embodiment.
Figure 5B:
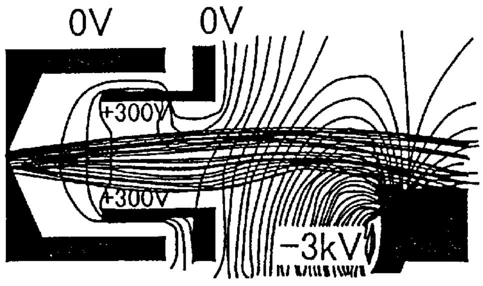
Figure 5C:
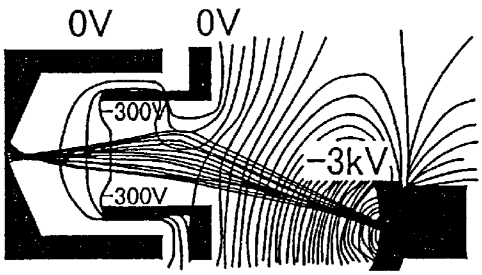
Figure 5D:
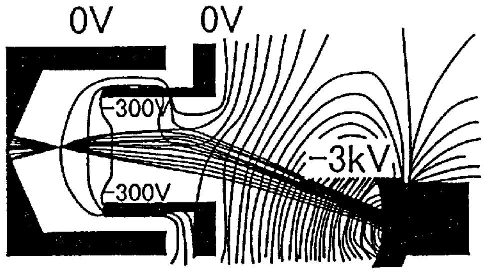
Figure 5E:
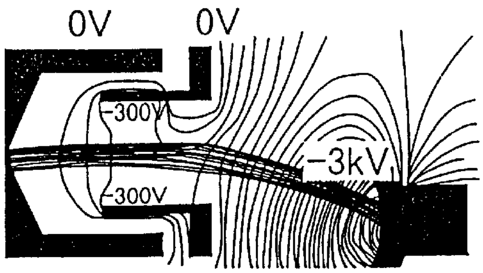
Figure 5F:
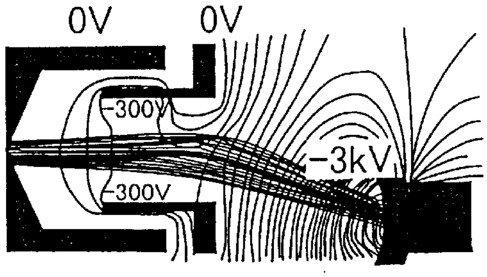

FIG. 4 shows a cross section of the portion composed of the endcap electrode 72, the ion-stopping electrode **73*a*, the ion-deflecting electrode 73*b*, and the detector 21, which are shown in FIG. 3, in more detail, and the positional relationship among the above parts is also shown in this figure. The distance between the central axis of the aperture in the endcap electrode 72 and that of the detector 21 is set to 10 mm, and the distance between the pair of ion-stopping electrodes 73a and 73b, and the ion-detecting part of the detector 21, is set to 25 mm. FIG. 5 shows each example of the trajectories of ions ejected from the mass spectrometry unit, which were calculated for the arrangement shown in FIG. 4. The dotted lines indicate equipotential lines, and the solid lines indicate trajectories of the ejected ions. During the ion-trapping period, since ions with low energy; for example, ions with energy of 100 eV, are reflected by the potential of +300V applied to the ion-stopping electrode 73a, such ions cannot pass through the aperture of the ion-stopping electrode 73a, and reach the detector 21. Ions with energy of more than 300 eV, which have passed the aperture of the ion-stopping electrode 73a, are deflected by the electric field generated by the electrodes 73a and 73b, and do not reach the detector 21 even if the voltage of −3 kV is applied to the detector 21, as shown in diagrams (a) and (b) in FIG. 5. Also, since ions with very high energy, for example, 3 kV, proceed almost straight through without being deflected by the electric field generated by the electrodes 73a and 73b, they do not reach the detector 21. Further, even if there are neutral particles with high energy, which are ejected from the mass spectrometry unit, and may be detected by the detector 21, since they proceed straight, they cannot reach the detector 21. Next, during the mass-analyzing period, the voltage of −300V is applied to the ion-stopping electrode 73a. Although the detector 21 is located at the position shifted from the central axis of the outlet in the endcap electrode 72, ions ejected from the outlet in the endcap electrode 72 are deflected toward the detector 21 by the electric field generated by the electrodes 73a and 73b, and can reach the detector 21, independent of their energy, as shown in diagrams (c), (d), (e), and (f) in FIG. 5**.

In the following, an example of a method for switching the voltage applied to the detector 21, which is performed in the third embodiment, will be explained.

This embodiment, in which the voltage applied to the detector 21 is switched, provides another means for protecting an ion detector. In a secondary-electron multiplier which is frequently used for an ion detector, secondary electrons generated by ions which have entered the electron multiplier are amplified and detected. The amplification factor of the secondary electron multiplier depends on the voltage applied to the electron multiplier. Therefore, it is possible to prevent the detector from receiving the damage due to ions reaching the detector during the ion-trapping period, by setting the voltage applied to the secondary electron multiplier to a small absolute value (for example, −1 kV) during the ion-trapping period, and to a large absolute value (for example, −3 kV) during the mass-analyzing period.

Figure 6:
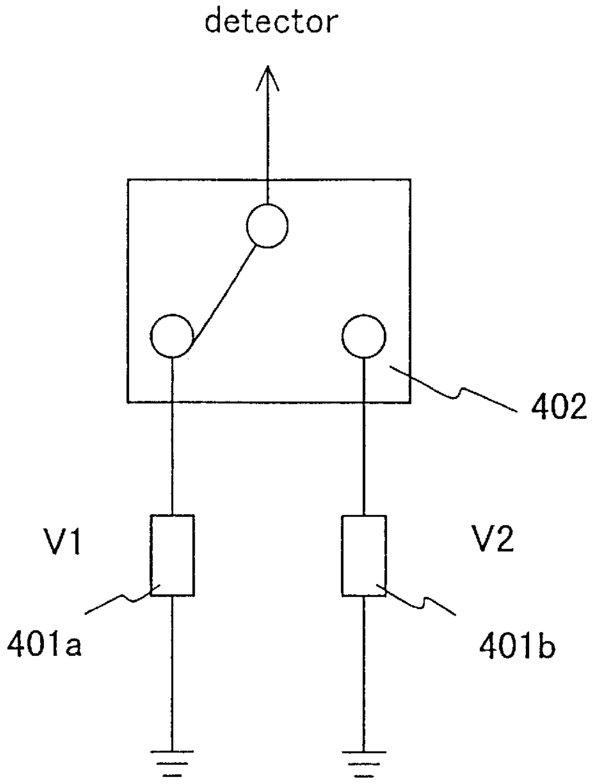
FIG. 6 is a diagram showing a main portion of a mass spectrometer of a third embodiment according to the present invention.
Figure 7:
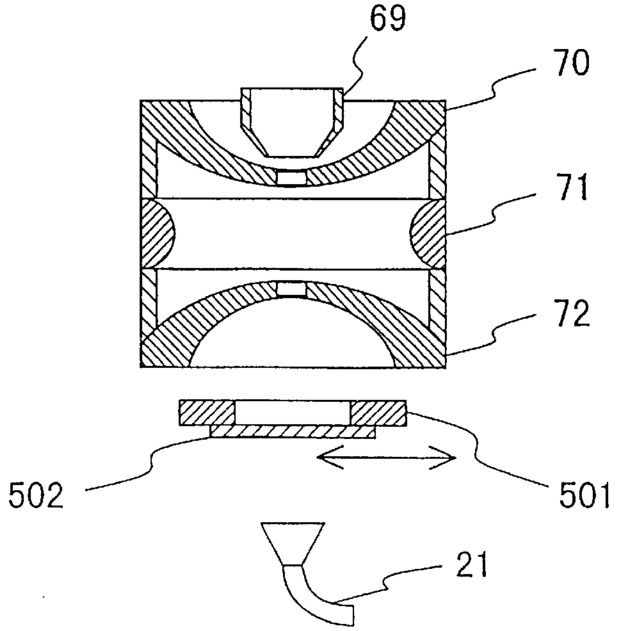
FIG. 7 is a diagram showing a main portion of a mass spectrometer of a fourth embodiment according to the present invention.

However, since it needs a certain time for the output of a power source to change to a predetermined voltage even if the set voltage of the power source is switched to the predetermined voltage, it is difficult to switch the voltage applied to the detector instantaneously. Accordingly, as shown in FIG. 6, the voltage applied to the detector can be instantaneously switched by switching the voltage applied to the detector, between V1 and V2, with a switch 402 connected to two power sources 401a and 401b. For example, V1 and V2 are set to −1 kV and −3 kV, and the detector is connected to the power source 401b during the mass-analyzing period. Thus, damage to the detector is prevented by setting the voltage applied to the detector by using the above switch during the ion-trapping period. Moreover, since it is possible to set V1 to 0V, the power source 401a can be omitted, and the terminal of the switch, corresponding to this power source 401a, is grounded if the power source 401 is omitted.

In the following, an example of a mechanical shutter, which is performed in the fourth embodiment, will be explained.

Although the detector is protected by the electrical means in the embodiments 1–3, the above subject can be also solved by a mechanical means using a mechanical shutter.

In this embodiment, a movable plate 502 is located between the detector 21 and the endcap electrode 72 near the detector 21. Further, the movable plate 502 is supported by a movable plate-support unit 501. Meanwhile, it is possible to omit the ion-stopping electrode 73. It is preferable to use a conductive material such as metal for the movable plate in order to prevent the electrification of the movable plate. During the ion-trapping period, the movable plate 502 is positioned so that ions ejected from the mass spectrometry unit cannot reach the detector 21, that is, the ejected ions are intercepted. Conversely, during the mass-analyzing period, the movable plate 501 is moved so that ions ejected from the mass spectrometry unit can reach the detector 21.

In the following, an example of a method for adjusting the voltage applied to the ion-deflecting electrode 201, which is used in the fifth embodiment, will be explained.

In the ion-trap type mass spectrometry unit, as shown in FIG. 2, the amplitude of the high-frequency voltage applied to the ring electrode 71 is gradually increased during the mass-analyzing period. Accordingly, the energy of ions ejected from the mass spectrometry unit also tends to increase gradually as time goes on during the mass-analyzing period 302. Then, the efficiency of ions, reaching the detector 21 possibly decreases on the back side of the mass-analyzing period 302, depending on the location of the detector 21 in the composition of the mass spectrometer shown in FIG. 1. The reason for this is that since the trajectory of ions with high energy is changed only slightly by the electric field generated by the ion-deflecting electrode 201, such ions pass by the detector 21 without reaching it.

Figure 8:
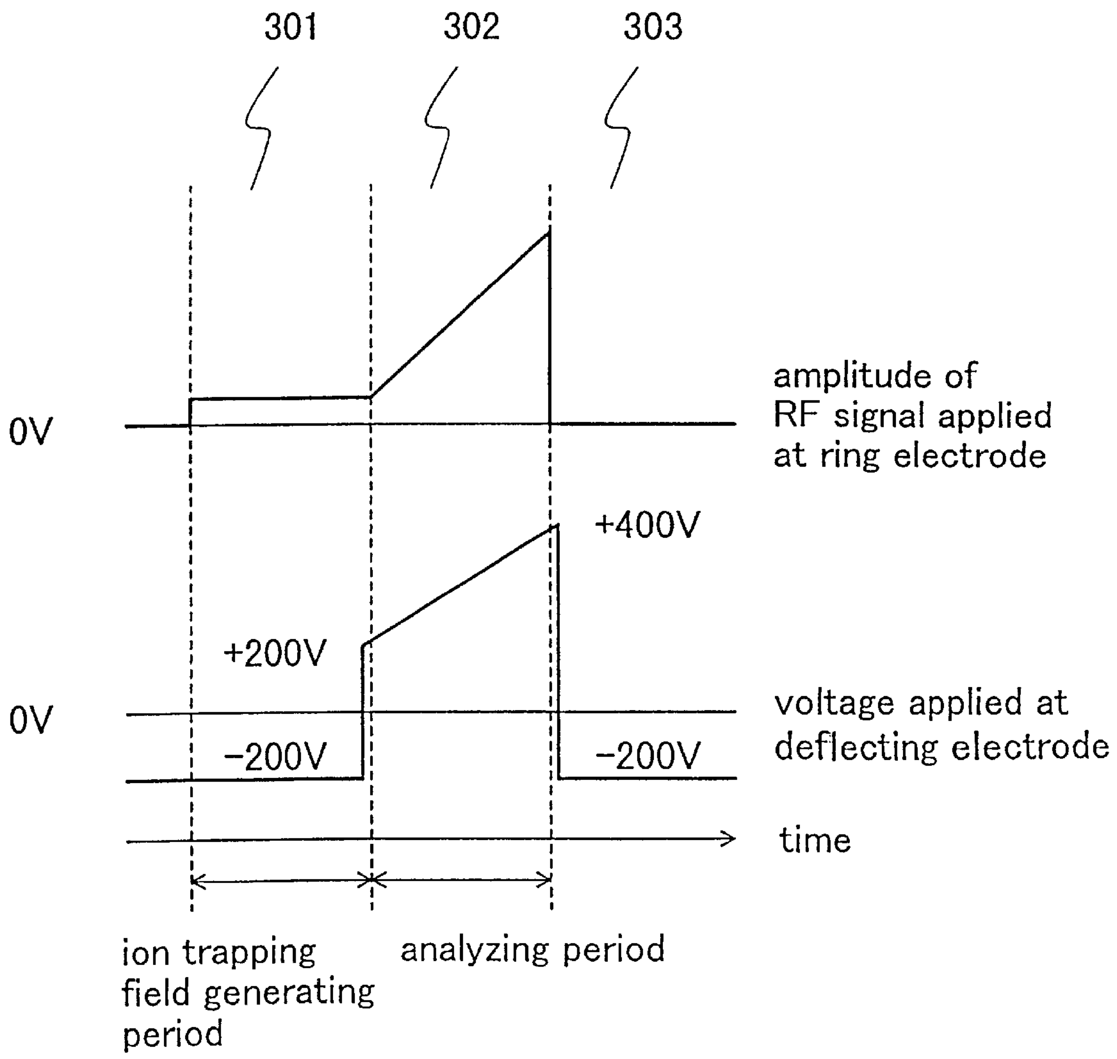
FIG. 8 is a time chart of voltages applied to various electrodes according to the present invention.

In one example such as that shown in FIG. 8, of countermeasures to cope with this problem, the voltage applied to the ion-deflecting electrode 201 is gradually increased, that is, the deflecting electric field is gradually strengthened. Since the deflecting action is strengthened in proportion as the energy of the ejected ions increase, the ejected ions can reach the detector 21, independent of the energy of the ions.

Although the plasma ion source type mass spectrometer such as the MIP-MS, the ICP-MS, etc., are used in the embodiments 1–5, the subject solved by the present invention is not restricted to that concerning the plasma ion source type mass spectrometer. There may exist the same subject in amass spectrometer which includes a comparatively large size ion-trap type mass spectrometry unit and a comparatively large current amount of ion source. Therefore, the present invention is also effective for other types of mass spectrometer, for example, a gas-analyzing apparatus. Since the sign of the voltage applied to each electrode in the above embodiments is reversed only if negative ions are analyzed in the mass spectrometer, the present invention is also effective for the case where negative ions are analyzed.

In accordance with the present invention, the problem of an excessively large signal source being input to a detector during the ion-trapping period can be solved, and this extends the life time of the detector, which in turn makes a long period of stable measurement possible.

What is claimed is:

1. A mass spectrometer comprising:

an ion source-generating unit to ionize a sample;

an ion-trap mass spectrometry unit for analyzing mass of respective ions introduced from said ion source-generating unit;

a detector to detect ions ejected from said ion-trap mass spectrometry unit; and a switching device for switching a voltage applied to said detector from a first voltage to a second voltage, wherein said first voltage is applied to said detector during an ion-trapping period in which said ions are trapped in said ion-trap mass spectrometry unit and said second voltage is applied to said detector during a mass-analyzing period in which said ions ejected from said ion-trap mass spectrometry unit are detected by said detector.

2. A mass spectrometer according to claim 1, wherein said detector is located at a position in a direction different from that in which said ions are ejected from an outlet of said ion-trap mass spectrometry unit.

3. A mass spectrometer comprising:

an ion source-generating unit to ionize a sample:

an ion-trap mass spectrometry unit for analyzing the mass of respective ions introduced from said ion source-generating unit;

a detector to detect ions ejected from said ion-trap mass spectrometry unit; and an ion-deflecting device situated between said detector and said ion-trap mass spectrometry unit, wherein said ion-deflecting device deflects said ions ejected from said ion-trap mass spectrometry unit such that said ions ejected do not reach said detector during an ion-trapping period in which said ions ejected are trapped in said ion-trap mass spectrometry unit, and said ion-deflecting electrode deflects said ions ejected such that said ions elected reach said detector during a mass-analyzing period in which said ions ejected are detected by said detector.

4. A mass spectrometer according to claim 3, wherein said ion-deflecting device is composed of a plurality of electrodes, and at least one of said electrodes is grounded.

5. A mass spectrometer comprising:

an ion source-generating unit to ionize a sample;

a first ion-deflecting device for deflecting ions generated in said ion source-generating unit;

a ring electrode with a more than 16 mm diameter at the position where a high-frequency voltage is applied to said deflected and introduced ions in order to analyze mass of the respective ions;

first and second dish electrodes, in each of which an aperture is shaped, arranged at both sides of said ring electrode, respectively;

a detector to detect ions ejected from said aperture of said second dish electrode; and a second ion-deflecting device, which is located between said second dish electrode and said detector, for deflecting said ions ejected from said aperture of said second dish electrode, wherein said second ion-deflecting device deflects said ions ejected from said aperture of said second dish electrode such that said ions ejected do not reach said detector during an ion-trapping period in which said ions ejected are trapped in said ion-trap mass spectrometry unit and said second ion-deflecting device deflects said ions ejected such that said ions ejected reach said detector during a mass-analyzing period in which said ions ejected are detected by said detector.

6. A mass spectrometry method of analyzing mass of ions, said method comprising the steps of:

ionizing a sample;

accumulating ions of said sample in an ion-trap mass spectrometry unit;

ejecting said ions accumulated in said ion-trap mass spectrometry unit in the increasing order of mass of said ions from said ion-trap mass spectrometry unit; and switching a voltage applied to a detector to detect said ejected ions, wherein a first voltage is applied to said detector during an ion-trapping period in which said ions are accumulated in said ion-trap mass spectrometry unit and a second voltage is applied to said detector during a mass-analyzing period in which said ions ejected from said ion-trap mass spectrometry unit are detected by said detector.

7. A mass spectrometry method according to claim 6, wherein said first and second voltages are negative voltages and an absolute value of said first voltage is lower than an absolute value of second voltage.

8. A mass spectrometry method of analyzing mass of respective ions, said method comprising the steps of:

ionizing a sample;

accumulating ions of said sample in an ion-trap mass spectrometry unit;

ejecting said ions accumulated in said ion-trap mass spectrometry unit in the increasing order of mass of said ions from said ion-trap mass spectrometry unit;

applying the voltage to an ion-deflecting device for deflecting said ejected ions; and detecting said deflected ions, wherein said ion-deflecting device deflects said ions ejected from said ion-trap mass spectrometry unit such that said ions ejected do not reach said detector during an ion-trapping period in which said ions ejected are accumulated in said ion-trap mass spectrometry unit, and said ion-deflecting device deflects said ions ejected such that said ions ejected reach said detector during a mass-analyzing period in which said ions ejected are detected by said detector.

9. A mass spectrometer according to claim 1, wherein said first and second voltages have negative values and an absolute value of said first voltage is lower than an absolute value of said second voltage.

10. A mass spectrometer according to claim 1, wherein said first voltage is 0V and said second voltage has a negative value.

11. A mass spectrometry method according to claim 6, wherein said first voltage is 0V and said second voltage has a negative value.

12. A mass spectrometer comprising:

an ion source-generating unit to ionize a sample;

an ion-trap mass spectrometry unit for analyzing mass of respective ions introduced from said ion source-generating unit;

a detector to detect ions ejected from said ion-trap mass spectrometry unit; and an ion-deflecting electrode located between said detector and said ion-trap mass spectrometry unit, wherein said ion-deflecting electrode deflects said ions ejected from said ion-trap mass spectrometry unit such that said ions ejected do not reach said detector during an ion-trapping period in which said ions ejected are trapped in said ion-trap mass spectrometry unit, and said ion-deflecting electrode deflects said ions ejected such that said ions elected reach said detector during a mass-analyzing period in which said ions ejected are detected by said detector.

13. A mass spectrometer comprising:

an ion source-generating unit to ionize a sample;

an ion-deflecting device for deflecting ions generated in said ion source-generating unit;

a ring electrode to which a high-frequency voltage is applied in order to analyze mass of the respective ions of said deflected and introduced ions;

first and second dish electrodes, in each of which an aperture is shaped, arranged at both sides of said ring electrode, respectively;

a detector to detect ions ejected from said aperture of said second dish electrode; and an ion-deflecting electrode, which is located between said second dish electrode and said detector, for deflecting said ions ejected from said aperture of said second dish electrode, wherein said ion-deflecting device deflects said ions ejected from said aperture of said second dish electrode such that said ions ejected do not reach said detector during an ion-trapping period in which said ions ejected are trapped in said ion-trap mass spectrometry unit and said ion-deflecting electrode deflects said ions ejected such that said ions ejected reach said detector during a mass-analyzing period in which said ions ejected are detected by said detector.

14. A mass spectrometer comprising:

an ion source-generating unit to ionize a sample;

an ion-deflecting device for deflecting ions generated in said ion source-generating unit;

a ring electrode to which a high-frequency voltage is applied in order to analyze mass of the respective ions of said deflected and introduced ions;

first and second dish electrodes, in each of which an aperture is shaped, arranged at both sides of said ring electrode, respectively;

an ion stopping electrode which has an aperture passing through said ions ejected from said aperture of said second dish electrode;

a detector to detect ions ejected from said aperture of said ion stopping electrode which is located between said aperture of said second dish electrode and detector; and an ion-deflecting electrode, which is located between said ion stopping electrode and said detector, for deflecting said ions ejected from said aperture of said ion stopping electrode, wherein said ion-deflecting electrode deflects said ions ejected from said aperture of said ion stopping electrode such that said ions ejected do not reach said detector during an ion-trapping period in which said ions ejected are trapped in said ion-trap mass spectrometry unit and said ion-deflecting electrode deflects said ions ejected such that said ions ejected reach said detector during a mass-analyzing period in which said ions ejected are detected by said detector.

15. A mass spectrometer comprising:

an ion source-generating unit to ionize a sample;

an ion-deflecting device for deflecting ions generated in said ion source-generating unit;

a ring electrode to which a high-frequency voltage is applied in order to analyze mass of the respective ions of said deflected and introduced ions;

first and second dish electrodes, in each of which an aperture is shaped, arranged at both sides of said ring electrode, respectively;

an ion stopping electrode which has an aperture passing through said ions ejected from said aperture of said second dish electrode and which is divided into a first portion and a second portion, wherein said first portion is a part of peripheral portion of said ion stopping electrode and is grounded, and a voltage is applied to said second portion which has a peripheral portion; and a detector to detect ions ejected from said aperture of said ion stopping electrode which is located between said aperture of said second dish electrode and detector;

wherein said second portion of said ion stopping electrode deflects said ions ejected from said aperture of said ion stopping electrode such that said ions ejected do not reach said detector during an ion-trapping period in which said ions ejected are trapped in said ion-trap mass spectrometry unit and said second portion of said ion stopping electrode deflects said ions ejected such that said ions ejected reach said detector during a mass-analyzing period in which said ions ejected are detected by said detector.

16. A mass spectrometer comprising:

an ion source-generating unit to ionize a sample;

an ion-trap mass spectrometry unit for analyzing mass of respective ions introduced from said ion source-generating unit;

a detector to detect ions ejected from said ion-trap mass spectrometry unit; and an ion-deflecting electrode located between said detector and said ion-trap mass spectrometry unit, and which deflects said ions ejected from said ion-trap mass spectrometry unit; wherein corresponding to an ion-trapping period in which said ions ejected are trapped in said ion-trap mass spectrometry unit, and a mass-analyzing period in which said ions ejected from said ion-trap mass spectrometry unit are detected by said detector, a different voltage is applied to said ion-deflecting electrode by switching the voltage applied to said ion-deflecting electrode.

17. A mass spectrometer comprising:

an ion source-generating unit to ionize a sample;

an ion-trap mass spectrometry unit for analyzing mass of respective ions introduced from said ion source-generating unit;

a detector to detect ions ejected from said ion-trap mass spectrometry unit;

two power sources for applying a voltage to said deflector; and a switch connected to said two power sources; wherein corresponding to an ion-trapping period in which said ions ejected are trapped in said ion-trap mass spectrometry unit, and a mass-analyzing period in which said ions ejected from said ion-trap mass spectrometry unit are detected by said detector, a different voltage is applied to said ion-deflecting electrode by switching the voltage applied to said detector.

* * * * *